United States Patent [19]
Liu et al.

[11] Patent Number: 5,645,891
[45] Date of Patent: Jul. 8, 1997

[54] CERAMIC POROUS MATERIAL AND METHOD OF MAKING SAME

[75] Inventors: Jun Liu, Richland; Anthony Y. Kim, Kennewick; Jud W. Virden, Richland, all of Wash.

[73] Assignee: Battelle Memorial Institute, Richland, Wash.

[21] Appl. No.: 344,330

[22] Filed: Nov. 23, 1994

[51] Int. Cl.$^6$ ..................................................... B05D 3/02
[52] U.S. Cl. ..................... 427/376.2; 427/385.5; 427/443.2
[58] Field of Search ............... 427/376.2, 385.5, 427/443.2

[56] References Cited

U.S. PATENT DOCUMENTS

| | | | |
|---|---|---|---|
| 5,030,351 | 7/1991 | Burggrant et al. | 210/500.21 |
| 5,098,684 | 3/1992 | Kresge et al. | 423/277 |
| 5,102,643 | 4/1992 | Kresge et al. | 423/328 |
| 5,215,943 | 6/1993 | Andersen et al. | 501/12 |
| 5,236,575 | 8/1993 | Bennett et al. | 208/46 |
| 5,238,676 | 8/1993 | Roth et al. | 423/713 |
| 5,250,184 | 10/1993 | Maier | 210/653 |
| 5,264,203 | 11/1993 | Beck et al. | 423/703 |
| 5,342,521 | 8/1994 | Bondet et al. | 210/490 |
| 5,439,624 | 8/1995 | Andersen et al. | 264/66 |
| 5,503,873 | 4/1996 | Govales et al. | 427/229 |

OTHER PUBLICATIONS

G. Yi et al., "Sol–Gel Processing of Complex Oxide Films", Ceramic Bulletin vol. 70 No. 7 1991 pp. 1173–1179.

JS beck, et al.; "A New Family of Mesoporous Molecular Sieves Prepared with Liquid Crystal Templates"; J. Am. Chem. Soc. 1992, vol. 114; pp. 10834–10843.

A Corma, MT navarro, and J. Pérez Pariente; "Synthesis of an Ultralarge Pore Titanium Silicate Isomorphours to MCM–41 and its Application as a Catalyst for Selective Oxidation of Hydrocarbons"; J. Chem. Soc., Chem. Commun., 1994; pp. 147–148.

Peter T. Tanev, Malama Chibwe & Thomas J. Pinnavaia; "Titanium–containing mesoporous molecular sieves for catalytic oxidation of aromatic compounds"; Letters to Nature, vol. 368, 24 Mar. 1994; pp. 321–323.

*Primary Examiner*—Benjamin Utech
*Attorney, Agent, or Firm*—Paul W. Zimmerman

[57] ABSTRACT

The invention is a mesoporous ceramic membrane having substantially uniform pore size. Additionally, the invention includes aqueous and non-aqueous processing routes to making the mesoporous ceramic membranes. According to one aspect of the present invention, inserting a substrate into a reaction chamber at pressure results in reaction products collecting on the substrate and forming a membrane thereon. According to another aspect of the present invention, a second aqueous solution that is sufficiently immiscible in the aqueous solution provides an interface between the two solutions whereon the mesoporous membrane is formed. According to a further aspect of the present invention, a porous substrate is placed at the interface between the two solutions permitting formation of a membrane on the surface or within the pores of the porous substrate. According to yet another aspect of the present invention, mesoporous ceramic materials are formed using a non-aqueous solvent and water-sensitive precursors.

30 Claims, 15 Drawing Sheets

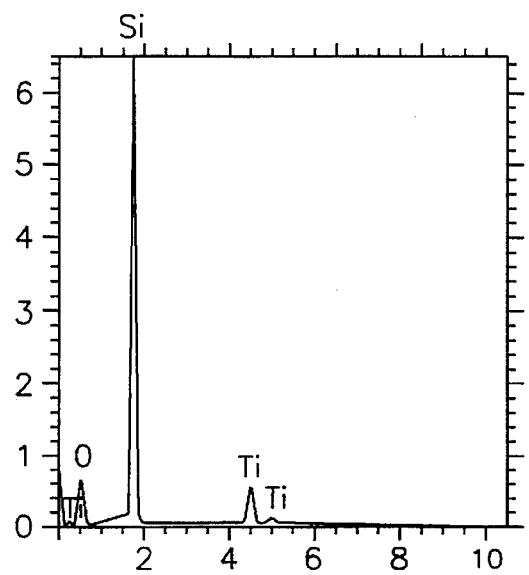
FIGURE 6d-a
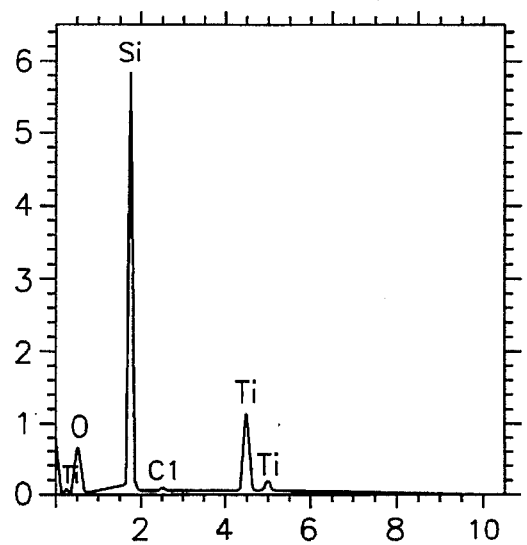
FIGURE 6d-b
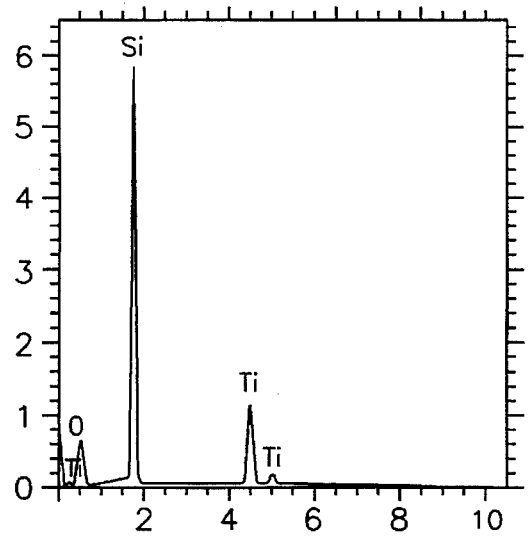
FIGURE 6d-c
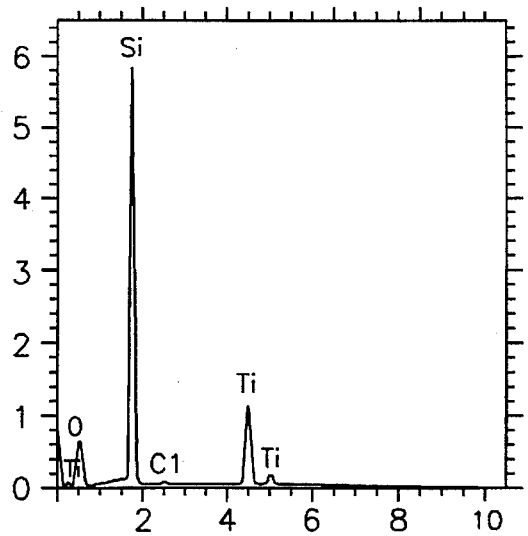
FIGURE 6d-d

CERAMIC POROUS MATERIAL AND METHOD OF MAKING SAME

This invention was made with Government support under Contract DE-AC06-76RLO 1830 awarded by the U.S. Department of Energy. The Government has certain rights in the invention.

FIELD OF THE INVENTION

The present invention relates generally to a mesoporous ceramic material having uniform pore size, and a method for making the uniform pore size mesoporous ceramic material.

As used herein, the term mesoporous refers to pore sizes from about 1.3 nm to about 50 nm.

As used herein the term ceramic refers to complex compounds and solid solutions of both metallic and nonmetallic elements joined by ionic and covalent bonds. Most often, ceramic materials are a combination of inorganic elements. Occasionally, ceramic materials may contain carbon. Examples of ceramic materials include but are not limited to metal oxides, compounds of metal oxides, metal carbides, and nitrides, and carbonates. More specifically, for example ceramic materials include but are not limited to silica, titania, alumina, titanium silicate, barium titanate, titanium carbide, titanium nitride, aluminum nitride, silicon carbide, and silicon nitride. Ceramic materials may be found naturally in animal shells, bones, and teeth or may be found in porcelain or other man made products.

BACKGROUND OF THE INVENTION

Porous materials are commonly used as membranes, separation media, catalysts, catalyst supports, chemical sensors and a host of other applications. One of the challenges in making porous materials is controlling the pore size distribution. Controlled pore size distribution is essential for the size- and/or geometry-based separation of molecules, ions, or fine particles. A particular pore size within a porous catalyst particle may also favor chemical kinetics of a particular reaction. Clearly it would be advantageous for the porous catalyst particle to have pores all of the desired size to favor the desired reaction and/or separation process.

A research team, C. T. Kresge, M. E. Leonowicz, W. J. Roth, and J. C. Vartuli, developed a synthetic mesoporous crystalline material described in U.S. Pat. Nos. 5,264,203, 5,098,684, 5,102,643, and 5,238,676. The mesoporous crystalline material is made from metal oxide precursors in an aqueous solution of an organic directing agent, for example quaternary ammonium ions. The aqueous solution is prepared by dissolving in water an organic directing agent, for example cetyltrimethylammonium chloride (CTAC) in an amount of about 29 percent by weight (wt %) of the organic directing agent. The aqueous solution is contacted with an ion exchange material for replacement of halide ions with hydroxide ions. Metal oxide precursors are then mixed into the ion exchanged organic directing agent forming a reactive mixture. Metal oxide precursors include sodium aluminate, alumina, silica, and tetraethylorthosilicate. Optionally, a second aqueous solution of tetramethylammonium silicate may be added to the reactive mixture. The reactive mixture is placed in a vessel and heated to a temperature between 95° to 150° C. under autogenous pressure for a time from about a few hours to several days. A solid product in the form of powders or granules is formed and recovered by filtration, optionally rinsed with water, then calcined at about 540° C. for about 1 hour in a nitrogen atmosphere followed by 6 hours in an air environment. The calcined particles exhibit pore sizes in the range from about 13 Å to about 200 Å with variance of pore size from about 15% to about 25%.

Although the method of Kresge et al. produces substantially uniform pore sized materials, the materials are in powder form which is difficult to form into high aspect ratio products. A high aspect ratio product is geometrically three-dimensional and has at least one dimension substantially larger than the other(s). Examples of high aspect ratio products include but are not limited to membranes and coatings. In addition, the method of Kresge et al. involves aqueous phase chemistry which cannot produce certain classes of mesoporous materials from water-sensitive precursors. Water-sensitive precursors, for example metal alkoxides, undergo rapid hydrolysis and condensation in aqueous solution leading to dense precipitated metal oxides or other separate phases which lack substantially uniform mesopores. Although silicon alkoxide precipitates may be re-dissolvable as in the method of Kresge et al., many metal alkoxide precipitates are not readily re-dissolvable under the reaction conditions at which the mesoporous ceramic materials are synthesized. Alkoxide precipitates that are not readily re-dissolvable, specifically for example metal alkoxides, include but are not limited to titanium (IV) ethoxide, titanium (IV) isopropoxide, titanium (IV) butoxide, zirconium (IV) propoxide, and zirconium (IV) isopropoxide, zirconium (IV) butoxide, niobium (V) ethoxide, and yttrium oxide isopropoxide. Other water-sensitive precursors leading to metal oxides that do not readily re-dissolve include but are not limited to many of the metal halides, for example metal chlorides including but not limited to titanium (III) chloride, titanium (IV) chloride, tantalum (V) chloride, zirconyl chloride, niobium (V) chloride, hafnium (IV) chloride, yttrium (III) chloride, scandium chloride, lanthanum chloride, and tin (IV) chloride. Because many metal oxide precursors are water sensitive and because their precipitates are often not substantially re-dissolvable, there are a significant number of metal oxides and multicomponent metal oxide compositions that cannot be formed into a mesoporous, uniform pore-sized product by an aqueous method, for example Kresge et al.

Most ceramic membranes are made by sol-gel and aerogel techniques as summarized by C. J. Brinker and G. W. Scherer, SOL-GEL SCIENCE, (Academic Press, Inc., San Diego, Calif., 1990, pp. 868–870. Particles or chemical precursors are mechanically coated, dried and sintered. Ceramic membranes made in this manner have wide pore size distribution, for example one standard deviation greater than about 15%, random pore arrangement, and random pore shape.

Therefore, it is an object of the present invention to produce high aspect ratio products having substantially uniform pore size distribution.

It is a further object of the present invention to make high aspect ratio products having substantially uniform pore size using a water-sensitive precursor that has a propensity of forming non-dissolvable precipitates in the presence of water.

It is yet a further object of the present invention to form ceramic membranes having substantially uniform pore size distribution.

It is still a further object of the present invention to make substantially uniform pore-sized mesoporous materials using a water-sensitive precursor that has a propensity of forming non-dissolvable precipitates in the presence of water.

SUMMARY OF THE INVENTION

The invention is a mesoporous ceramic high aspect ratio product, or membrane, having substantially uniform pore size. Additionally, the invention includes aqueous and non-aqueous processing routes to making the mesoporous ceramic membranes. In addition, the invention includes mesoporous ceramic materials made with the non-aqueous processing route.

According to one aspect of the present invention, a method for making a mesoporous ceramic membrane includes substantially the steps recited above used by Kresge et al. and with the additional step of inserting a substrate into the reaction chamber at pressure so that rather than forming particles, the reaction products nucleate on the substrate and form a membrane thereon. The substrate may be solid or porous.

According to another aspect of the present invention, a method for making a mesoporous ceramic membrane includes the steps recited above used by Kresge et al. but with the additional step of providing a second solution that is sufficiently immiscible in the aqueous solution or sufficiently reacts with the aqueous solution to provide an interface between the two solutions whereon the mesoporous membrane is formed.

According to a further aspect of the present invention, a method for making a mesoporous ceramic membrane combines the previous two aspects so that a porous substrate is placed at the interface between the two solutions permitting formation of a membrane on the surface or within the pores of the porous substrate.

According to yet another aspect of the present invention, a method for making a mesoporous ceramic material has the steps of (a) forming a non-aqueous solution of a surfactant in a non-aqueous solvent, (b) adding a ceramic precursor (s) to the non-aqueous solution, and (c) adding controlled amount of water to obtain a reactive mixture. An additional step (d) of adding a promoter to the reactive mixture may be done to promote or encourage ordering of the pores. The reactive mixture reacts to form a mesoporous ceramic material.

The subject matter of the present invention is particularly pointed out and distinctly claimed in the concluding portion of this specification. However, both the organization and method of operation, together with further advantages and objects thereof, may best be understood by reference to the following description taken in connection with accompanying drawings wherein like reference characters refer to like elements.

BRIEF DESCRIPTION OF THE DRAWINGS

FIG. 6b is an enlargement of a portion of the material shown in FIG. 6a.

FIG. 6c is an X-ray diffraction pattern of the material of FIG. 6a.

FIGS. 6d-a, 6d-b, 6d-c, and 6d-d are composition analysis traces of silicotitanate material made with increasing quantities of controlled amounts of water.

DESCRIPTION OF THE PREFERRED EMBODIMENT(S)

Figure 1A:
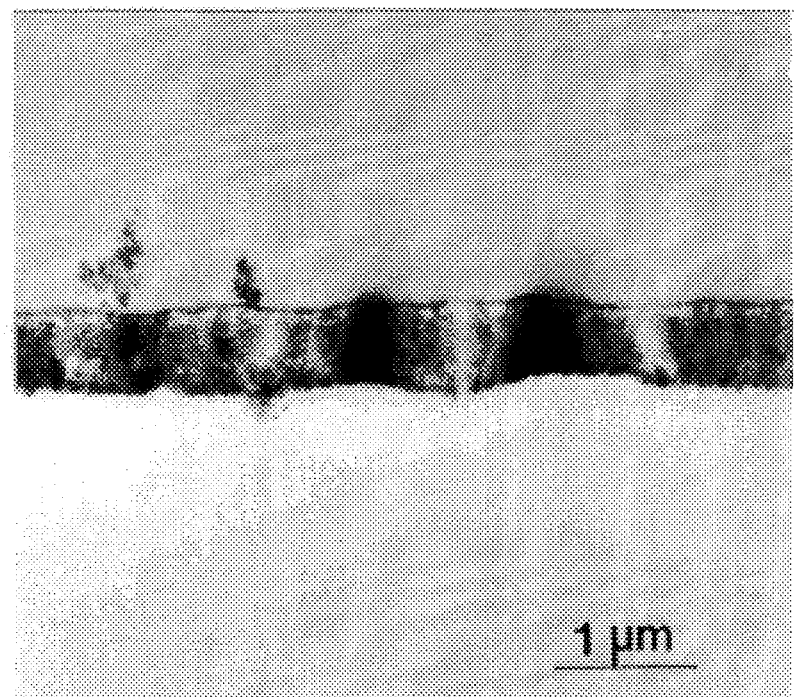
FIG. 1a is a photomicrograph of a cross section of a porous ceramic membrane.

The invention is a mesoporous ceramic membrane having substantially uniform pore size. Additionally, the invention includes aqueous and non-aqueous processing routes to making the mesoporous ceramic membranes. In addition, the invention includes mesoporous ceramic materials made with the non-aqueous processing route.

Aqueous Route

According to one aspect of the present invention, a method for making a mesoporous ceramic membrane includes the steps of:

(a) placing a reactive mixture of at least one ceramic precursor and at least one surfactant into a reaction vessel;

(b) inserting a substrate into the reaction vessel; and (c) heating the reactive mixture and the substrate in the reaction vessel for a period of time and forming the mesoporous ceramic material on the substrate.

It will be apparent to those skilled in the art of making mesoporous ceramic materials that steps (a) and (b) above may be reversed to achieve the same result.

The reactive mixture is obtained by preparing a solution of water and a surfactant. The surfactant functions as a templating agent that provides a pattern or template for formation of pores. More specifically, the surfactant is, for example an alkyl ammonium or phosphonium compound. Preferably, the solution anion is hydroxide. In solutions wherein the solution anion is one or more halide ions, it is preferred to replace a portion of halide ions with hydroxide ions forming an aqueous surfactant halide/hydroxide solution. Ceramic precursors are mixed into the aqueous surfactant agent solution or aqueous surfactant halide/hydroxide solution forming a reactive mixture.

Yet more specifically, the surfactant (R) is an ammonium or phosphonium ion of the formula $R_1R_2R_3R_4Q^+$ wherein Q is nitrogen or phosphorous and wherein at least one $R_1$, $R_2$, $R_3$, and $R_4$ is aryl or alkyl of from 6 to about 36 carbon atoms, the remainder of $R_1$, $R_2$, $R_3$, and $R_4$ being selected from the group consisting of hydrogen, alkyl of from 1 to 5 carbon atoms and combinations thereof. The compound from which the above ammonium or phosphonium ion is derived may be, for example, the hydroxide halide, silicate, or mixtures thereof. A preferred templating agent compound is cetyl-trimethylammonium chloride (C-TAC). It will be apparent to those skilled in the chemical arts that dodecyl- (D-TAC), tetradecyl- (T-TAC), and hexadecyl- (H-TAC) are substitutable for C-TAC.

The molar ratio of water to surfactant in the reactive mixture may range from about 40 to about 500 but is preferably from about 60 to about 100. Above about 500, the surfactant molecules are free in solution and do not form the micellar aggregates which are critical to the formation of mesopores in the final product. The micelles ultimately determine pore size and ordering in the ceramic porous material. Below about 40, the micelles form ordered mesophases without the ceramic precursors present. Formation of the ordered mesophase causes a large increase in solution viscosity, thereby making it difficult to add and mix the ceramic precursors.

Ordering is the alignment of pores parallel to a single axis. Often, groups of pores will be aligned but each group of pores may not be ordered or aligned with respect to other groups. When there are multiple groups that are not aligned with respect to each other, there can be gaps in the membrane between aligned groups wherein the gap may be a larger opening through the membrane than the pore. Hence, for certain applications, multi-layer membranes may be needed.

When the surfactant solution contains non-hydroxide anions, it may be desirable to replace the anions, for example halide ions, with hydroxide ions. Replacing halide ions with hydroxide ions may be achieved in several ways, for example ion exchange and/or addition of a halide precipitating compound, for example silver oxide. It is preferred, however, to perform the replacement by contacting the surfactant halide solution with an ion exchange material, most preferably a strong base ion exchange material. Preferred ion exchange materials include resins having quaternary ammonium groups, for example DOWEX-1 or DOWEX-SBR. The amount of halide that is exchanged may range from about 1 wt % to about 99 wt % depending on the desired initial Ph of the reactive mixture. Initial Ph is adjusted to maximize solubility of colloidal metal oxides (for example silica) to be dissolved and re-precipitated as mesoporous material.

Metal oxide precursors, expressed as oxides, and mole ratio ranges are set forth in the following table wherein R is the surfactant, M is an alkali or alkaline earth metal, and e and f are the weighted average valences of M and R respectively.

TABLE 1

Mole Ratio Ranges

| Reactants | Useful | Preferred |
| --- | --- | --- |
| $Al_2O_3/SiO_2$ | 0–0.5 | 0.001–0.5 |
| Solvent/$SiO_2$ | 1–1500 | 5–1000 |
| $OH^-/SiO_2$ | 0–10 | 0–5 |
| $(M_{2/e}O + R_{2/f}O)/(SiO_2 + Al_2O_3)$ | 0.01–20 | 0.05–5 |
| $(M_{2/e}O)/(SiO_2 + Al_2O_3)$ | 0–5 | 0–3 |
| $(R_{2/f}O)/(SiO_2 + Al_2O_3)$ | 0.01–2 | 0.03–1 |

Additionally, a promoter, specifically a quaternary ammonium cation stabilized with a metal oxide anion, may be added to the reactive mixture. The promoter encourages or promotes ordering of the pores. Promoters include tetramethylammonium-stabilized metal oxide anions. Metal oxide anions include but are not limited to, silicate, aluminate, and titanate. Specifically, tetraethylammonium silicate, tetrabutylammonium silicate are preferred. Tetramethylammonium silicate is most preferred. The promoter may be purchased or produced as part of the reaction process.

Production of tetramethylammonium silicate can be accomplished by preparing a mixture of tetramethylammonium hydroxide, colloidal silica, and distilled water followed by aging of the mixture for several days. For example, a 10 wt percent $SiO_2$ solution with tetramethylammonium$^+$/Si mole ratio=0.5 can be prepared by mixing together 60 g of colloidal silica, 91 g tetramethylammonium chloride, and 449 g of water, followed by aging the mixture for 5 days.

Alternatively, a silica precursor can be reacted in an aqueous tetramethylammonium hydroxide solution. The silica precursor may be from the group of tetraalkoxysilanes, preferably tetraethoxysilane or tetramethoxysilane. For example, a 10 wt % $SiO_2$ solution with tetramethylammonium$^+$/Si mole ratio=0.5 can be prepared by reacting 152 g tetramethoxysilane with a solution of tetramethylammonium hydroxide (91 g) in water (357 g).

Inserting a substrate may be done prior to or during heating of the reaction vessel. It is preferred that the substrate be inserted prior to a porous ceramic material-forming reaction begins. The preferred substrate is one upon which reaction products will collect and adhere. More specifically, the substrate should be a ceramic oxide or silica-containing material. Yet further preferred are substrate materials having an element similar to a non-oxygen element present in the reactive mixture. Preferred substrate materials include but are not limited to silicon, silica, zirconia, titania, and borosilicate glass. The substrate may be a dense solid or porous material.

The reactive mixture is heated to a temperature from about 25° C. to about 250° C., preferably from about 50° C. to about 175° C.

A layer of mesoporous material having a substantially uniform pore structure forms or is grown on the substrate.

According to another aspect of the present invention, a method for making a mesoporous ceramic membrane includes the steps recited above, optionally omitting the heating step, but with the additional step of providing a second solution that when combined with the reactive mixture, forms an interface between the reactive mixture and the second solution. The interface may be formed as a result of the reactive mixture and the second solution being substantially immiscible. Alternatively, the interface may be formed as a result of a precipitate-forming reaction creating a solid interface between the two solutions. The second solution may be aqueous or non-aqueous. The second solution is one or a combination of tetramethylammonium silicate, tetraethylammonium silicate, or tetrabutylammonium silicate. When tetramethylammonium silicate is used in the second solution, it is preferably omitted from the first solution. For the solutions to be immiscible, one solution must be polar as for example water or formamide, and the other solution apolar as for example hexane or cyclohexane. Formation of a solid interface depends upon the soluble constituents in one solution being or becoming insoluble in the other solution upon contact of the two solutions. Solubilities are controlled in several ways including but not limited to pH, salt concentration, and/or charge density of dissolved ions in the two solutions.

According to a further aspect of the present invention, a method for making a mesoporous ceramic membrane combines the previous two aspects so that a porous substrate is placed at the interface between the two solutions permitting formation of a membrane on the surface or within the pores of the porous substrate. For example, a porous hollow fiber having a closed end and having 1–2 mm inside diameter may serve as the porous substrate. In this example, the closed end is inserted into the aqueous solution and the second solution is injected into the open end of the porous hollow fiber. Alternatively, other porous substrates complex in shape, such as narrow bore tubes (2–10 mm inside diameter) and wide bore tubes (10–25 mm inside diameter), or porous substrates simple in shape such as a flat sheet, may be used. An interface may be created on or within a porous substrate by saturating the porous substrate with one solution and then contacting the saturated porous substrate with the second solution. Alternatively for the porous flat sheet as a substrate, the two solutions may be initially separated into two chambers by the flat sheet and allowed to react with each other for example by diffusion into the substrate or by pumping one solution through the substrate and into the other solution.

Non-Aqueous Route

According to yet another aspect of the present invention, a method for making a mesoporous ceramic material has the steps of (a) forming a non-aqueous solution of a surfactant in a non-aqueous solvent, (b) adding at least one ceramic precursor wherein at least one of the ceramic precursors is a water-sensitive precursor to the non-aqueous solution, and (c) adding a controlled amount of water to form a reactive mixture. Optionally, a step (d) adding a promoter to obtain a reactive mixture may be added to promote or encourage microstructural ordering of pores. The reactive mixture reacts to form a mesoporous ceramic material. Heating the reactive mixture may be done to initiate formation of the mesoporous ceramic material or to decrease the amount of time necessary for formation compared to formation at ambient conditions of temperature and pressure. The level of heating depends upon the non-aqueous solvent that is selected. When formamide is the non-aqueous solvent, heating may be done at temperatures from about 25° C. to about 180° C., and preferably from about 75° C. to about 125° C. for times from about 4 hours to about 1 week. When glycerol is the non-aqueous solvent, heating may be done at temperatures from about 280° C. and preferably from about 60° to 150° C.

Useful and preferred ranges of reactive mixture constituents are set forth in Table 2.

TABLE 2

| Non-Aqueous Route Mole Ratio Ranges | | |
|---|---|---|
| Mole Ratio | Useful | Preferred |
| Non-aqueous solvent/surfactant | 40 to 500 | 60 to 100 |
| Water-sensitive precursor/surfactant | 0.01 to 100 | 0.05 to 1 |
| Promoter/surfactant | 0 to 10 | 0.1 to 1 |
| Initial H$_2$O/water-sensitive precursor | 0 to 100 | 2 to 20 |
| Reaction H$_2$O/water-sensitive precursor | 4 to 200 | 20 to 100 |
| Metal (from promoter)/surfactant | 0 to 100 | 0.5 to 1 |

The controlled amount of water may be added in several ways. It is preferred to add the controlled amount of water via a solution of non-aqueous solvent and a controlled amount of water such that the mole ratio of controlled amount of water to water-sensitive precursor from about 1 to about 100, depending upon the specific water-sensitive precursor selected. For titanium (IV) butoxide, the preferred water to titanium (IV) butoxide mole ratio is at least 2.

Alternatively the controlled amount of water can be added directly as pure water, either before or after the water-sensitive precursor is added to the nonaqueous surfactant solution. When pure water is added, it is preferred to add the pure water to the nonaqueous solution before the water-sensitive precursor is added, in order to minimize precipitation of the water-sensitive precursor to the metal oxide before sufficient binding of the metal species with the surfactant occurs.

The controlled amount of water may also be added to the nonaqueous surfactant solution in the form of a hydrated metal oxide material, for example hydrated silica in the form of colloidal particles.

Non-aqueous solvents include but are not limited to formamide, dimethylsulfoxide, dimethylformamide, formic acid, glycerol, ethanol and methanol. Non-aqueous means substantially without water, preferably an amount of water less than about 3 wt %, more preferably less than about 1 wt %, and most preferably less than about 0.5 wt %.

Water-sensitive precursors include but are not limited to MG; wherein M is a metal including but not limited to Yb, Y, Ta, Zr, Nb, Hf, Ti, V, Sc, La, Sn; and G is a group including but not limited to halide, alkoxide, $C_5H_5$, $C_5H_4C_3H_7$, and in some instances, oxygen. More specifically, metal alkoxides include but are not limited to titanium (IV) ethoxide, titanium (IV) isopropoxide, titanium (IV) butoxide, zirconium (IV) propoxide, and zirconium (IV) iso-propoxide, zirconium (IV) butoxide, niobium (V) ethoxide, and yttrium oxide isopropoxide. Further, specific examples of $C_5H_5$ compounds include $(C_5H_5)_3Sc$ tris (cyclopentadienyl)scandium and $(C_5H_5)_3La$ tris (cyclopentadienyl)lanthanum, and a specific example of a $C_5H_4C_3H_7$ compound is $(C_5H_4C_3H_7)_3La$ tris(i-propylcyclopentadienyl)lanthanum.

The amount of metal, from the water-sensitive precursor, in the substantially uniform pore size product composition made from formamide, has been found to increase by decreasing the amount of non-soluble material, for example colloidal silica, and by increasing the controlled amount of water with respect to the amount of water-sensitive precursor. In addition to the increase of the amount of metal, uniformity and ordering of pores is also improved with decreased colloidal silica and increased water. It is believed that substantial uniformity is achieved by reducing the amount of colloidal silica to a very small amount or none at all. Hence, the amount of colloidal silica with respect to water-sensitive precursor may range from a mole ratio of about 0.0 to about 1.0 but is preferably from about 0.0 to about 0.1.

Ordering of pores in the non-aqueous route products appears to be primarily in groups. In other words, pore alignment occurs with a group of pores, but pore groups are not necessarily aligned with each other.

According to a yet further aspect of the present invention, a method for making a mesoporous ceramic material combines two of the above aspects wherein two non-aqueous solutions that form an interface are used. The interface may be formed as a result of immiscibility of the two non-aqueous solutions or as a result of solid precipitation at the interface that would separate the two solutions. Heating may be used to initiate or accelerate formation of the mesoporous ceramic material at the interface.

According to an additional aspect of the present invention, a substrate may be inserted at the interface of the two non-aqueous solutions. The substrate is selected according to the same criteria as set forth for selection of a substrate for the aqueous route discussed previously above.

According to yet a further aspect of the present invention, a composition of porous ceramic material is an inorganic porous material having a hexagonal arrangement of substantially uniformly sized pores, and having a metal oxide derived from at least one water-sensitive precursor. Each pore has a diameter of at least 1.3 nm.

The metal in the metal oxide is at least one of the metals selected from the group of titanium, tantalum, zirconium, niobium, ytterbium, yttrium, hafnium, vanadium, scandium, lanthanum, and tin.

EXAMPLE 1

An experiment was performed to form a mesoporous layer on a substrate. CTAC (cetyltrimethylammonium chloride) was obtained from Kodak, Rochester, N.Y., sodium aluminate (54 wt % $Al_2O_3$, 41 wt % $Na_2O$) was obtained from Crescent Chemical, Hauppauge, N.Y., 20 nm amorphous silica particles (Hi-Sil 233) were obtained from PPG Industries, Pittsburgh, Penn., and tetramethylammonium silicate solution (10 wt % $SiO2$, 0.5 tetramethylammonium$^+$/Si) was obtained from SACHEM, Inc., Austin, Tex. De-ionized water was used to obtain 2 solutions of 29 wt % CTAC. One of the CTAC solutions was contacted with a Dowex-SBR (Dow Chemical, Midland, Mich.) ion exchange material to exchange chloride ion with hydroxide ion. Approximately 13 wt % chloride ion was exchanged. Exchanged (2.79 g) and unexchanged (6.42 g) CTAC solutions were combined to obtain an effective amount of chloride exchange of about 4%. Sodium aluminate (0.19 g), silica particles (1.13 g), and TMA solution (4.59 g) were added to the combined CTAC solution to form a reactive mixture.

The reactive mixture was placed in a fluorocarbon lined hydrothermal reactor with a silicon wafer positioned vertically within the hydrothermal reactor. The reactor and its contents were heated to 105° C. under autogenous pressure for 24 hours then allowed to cool to ambient temperature of about 25.5° C. The surface of the silicon wafer contained a layer of mesoporous material. The coated wafer was calcined at 540° C. for 1 hour in flowing nitrogen then in flowing air for 6 hours to remove any organic materials.

Figure 1B:
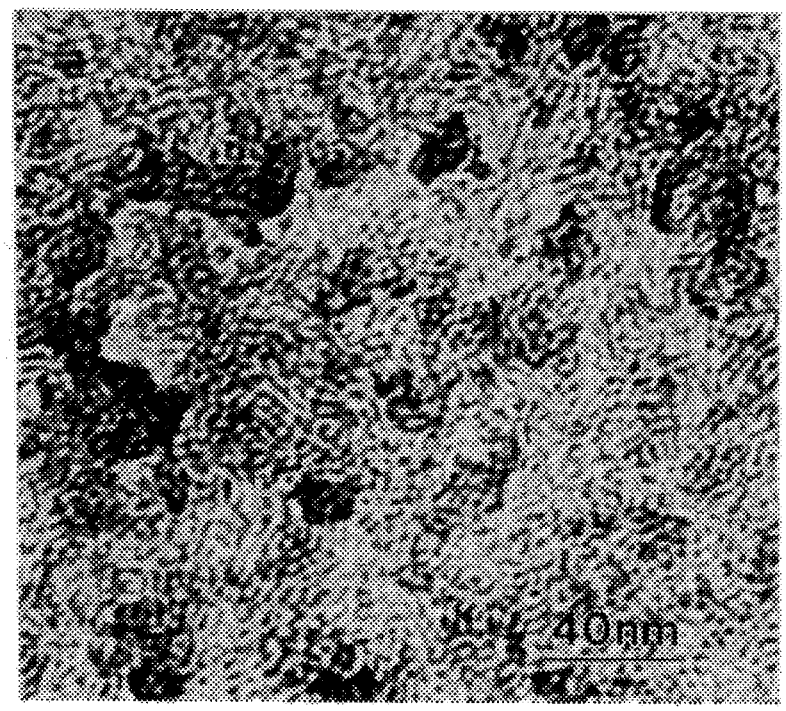
FIG. 1b is a photomicrograph of a surface of a porous ceramic membrane.

The mesoporous ceramic material layer was a membrane about 0.5 micron thick. In this experiment, individual pore diameter was about 3 nm. FIG. 1a shows a cross section photomicrograph of the membrane formed on the silicon wafer. FIG. 1b shows the structure of substantially uniform pore sizes. Pore orientation was random.

EXAMPLE 2

An experiment was performed to form a mesoporous layer on an interface. Materials for this experiment were obtained according to Example 1. The first solution was a mixture of 4.76 g 29 wt % aqueous CTAC solution (approximately 30% of the chloride exchanged with hydroxide), 0.096 g sodium aluminate and 0.068 g amorphous silica, and the second solution was tetramethylammonium silicate of 10 wt % $SiO_2$ and 0.5 tetramethylammonium$^+$/Si mole ratio. The first solution was placed in a polystyrene petri dish, and approximately 2.5 g of the second solution was carefully added dropwise with a dropper to form liquid lenses. The petri dish was handled in a manner so as not to disturb the liquid lenses and to avoid mixing. The first and second solutions were reacted in the sealed petri dish at 25° C. at atmosphere pressure for 12 days. After reaction, the product was dried under vacuum at 25° C. A small amount of dry product was then prepared for transmission electron microscope (TEM) characterization. The product was embedded into epoxy resin consisting of 5 parts (by weight) Buehler Epo-Kwick Resin (No 20-8128-032) and 1 part Buehler Epo-Kwick Hardener (No 20-8128-008). The epoxy resin was cured for 24 hours at room temperature. Microtomy was conducted on an NT 6000 Ultramicrotome (Sorval) with a Microstar diamond knife. TEM characterization was performed on a Philips 400 or Jeol 1200 microscope at 120 kV.

Figure 2:
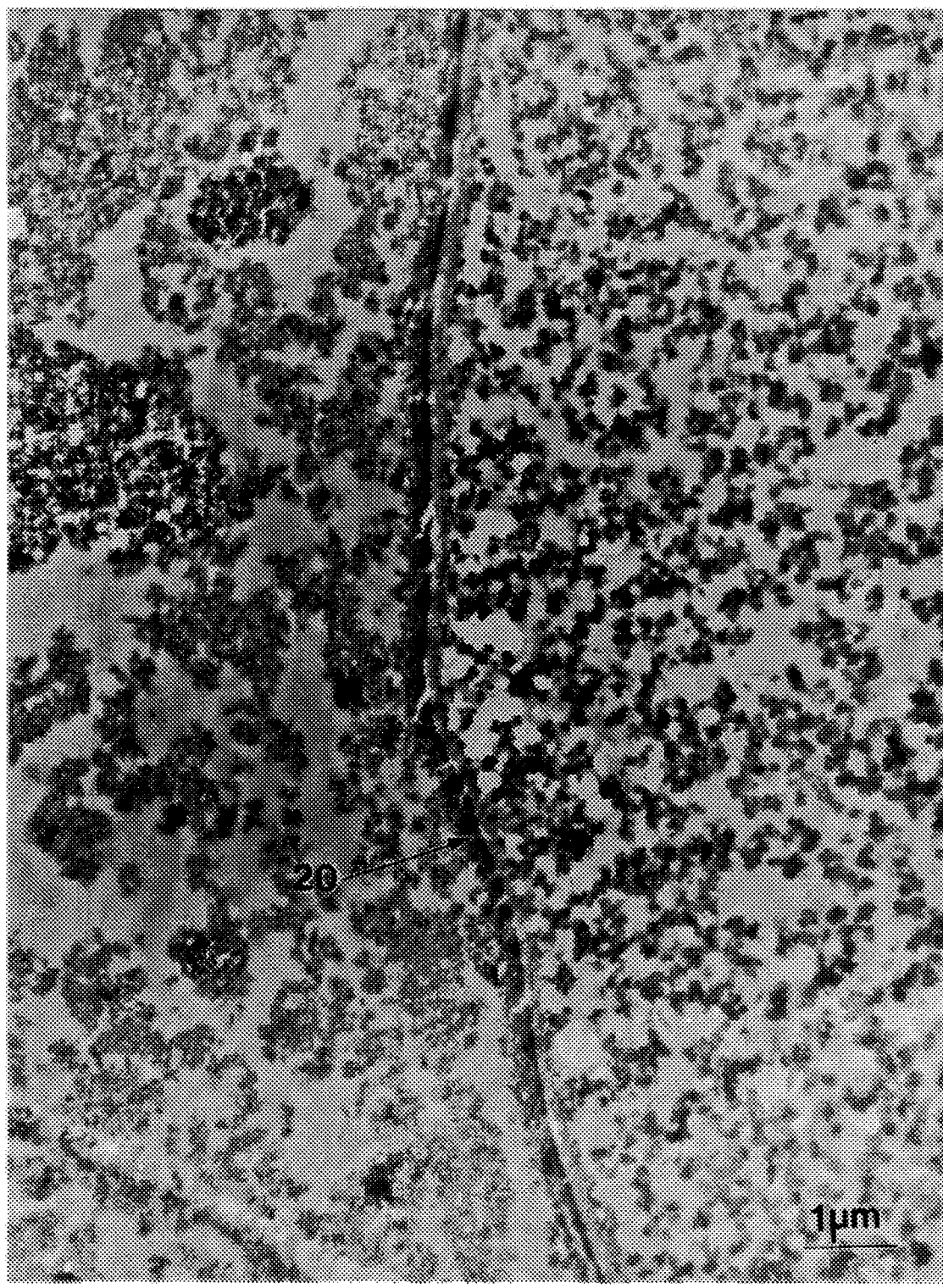
FIG. 2 is a photomicrograph of a membrane formed at a lens interface.

FIG. 2 is a photomicrograph of the dry product wherein the line 20 is a structure formed at the interface between the two solutions.

EXAMPLE 3

An experiment was conducted to make a membrane of porous ceramic material on an interface. The experiment was substantially identical to Example 2. Specifically, exchanged CTAC (3.652 g, 29 wt % CTAC, 9 percent of chloride exchanged with hydroxide) and unexchanged CTAC (8.49 g, 29 wt % CTAC in water) solutions were combined to obtain an effective amount of chloride exchange of about 3 mole percent. Sodium aluminate (0.25 g), silica particles (1.506 g), and TMA solution (6.074 g) were added to the combined CTAC solution to form a reactive mixture.

However, instead of forming lenses, the tetramethylammonium silicate was stirred into the first solution with a rod. Mixing was incomplete so that there were two liquid phases co-existing in the reactive mixture.

The reactive mixture was heated at 105° C. for 4 hours under autogenous pressure. Twenty minutes into reaction the reactive mixture was magnetically stirred for about 2 minutes.

Figure 3:
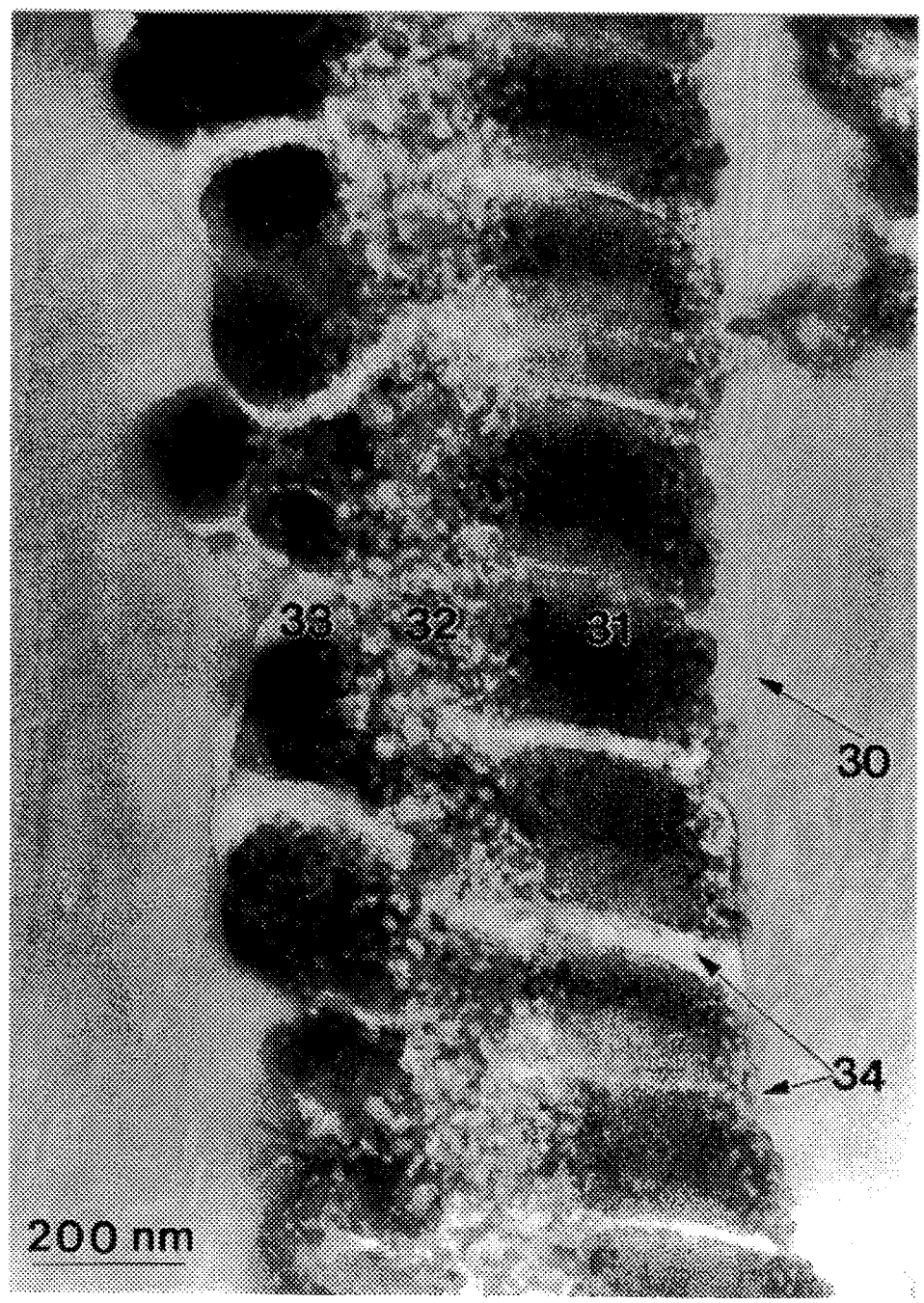
FIG. 3 is a photomicrograph of a membrane formed at an interface between two liquid phases.

A small amount of product was characterized by TEM as in Example 2, resulting in the photomicrograph of FIG. 3. A membrane 30 is observed at a boundary between the two liquid phases. The membrane 30 has three distinct layers. The first layer 31 is made up of randomly-packed (non-ordered) rod-like micelles within the metal oxide, the diameters of which are substantially uniform. The micelles determine pore size after calcination of the material. The second layer 32 is a microporous layer of the metal oxide which can be regarded as the supporting structure. The third layer 33 is made up of non-randomly-packed (ordered) rod-like micelles within the metal oxide. This third layer is the preferred structure. It is desired that the entire cross section of membrane 30 contain only the ordered structure of the third layer 33. The light lines 34 are cracks perpendicular to the membrane direction that were caused by microtoming with a diamond knife to prepare TEM samples and would not be present in the pre-tomed membrane.

EXAMPLE 4

An experiment was conducted to make an aluminosilicate porous ceramic material using a non-aqueous solvent. Materials were obtained as in Example 1 with the addition of formamide, obtained from J. T. Baker, Phillipsburg, N.J. Cetyltrimethyl ammonium chloride (CTAC) was dissolved in formamide, 10 wt % CTAC forming a non-aqueous solution. A portion of the non-aqueous solution was contacted with an ion exchange resin, DOWEX-SBR, to make an exchanged CTAC non-aqueous solution. Exchanged and unexchanged CTAC non-aqueous solutions were combined to form a non-aqueous preparation with an effective chloride exchange between about 3 and 12 mole %. Sodium aluminate (0.1 g), was mixed into the non-aqueous preparation (13 g) then colloidal silica (0.6 g HiSil) was added to the non-aqueous preparation. Tetramethylammonium silicate (2.30 g) was added last and thoroughly mixed into the solution to form a reactive mixture. The relative amounts of the above recited compounds are shown in Table E4-1.

The reactive mixture was stirred for two minutes at 25° C., sealed in a fluorocarbon-lined steel reactor, and reacted at 105° C. under autogenous pressure and static conditions (no stirring) for a total of 24 hours. After the 24 hours of heating, the reaction products were quenched in room temperature (25° C.) de-ionized water and recovered by filtration.

Figure 4A:
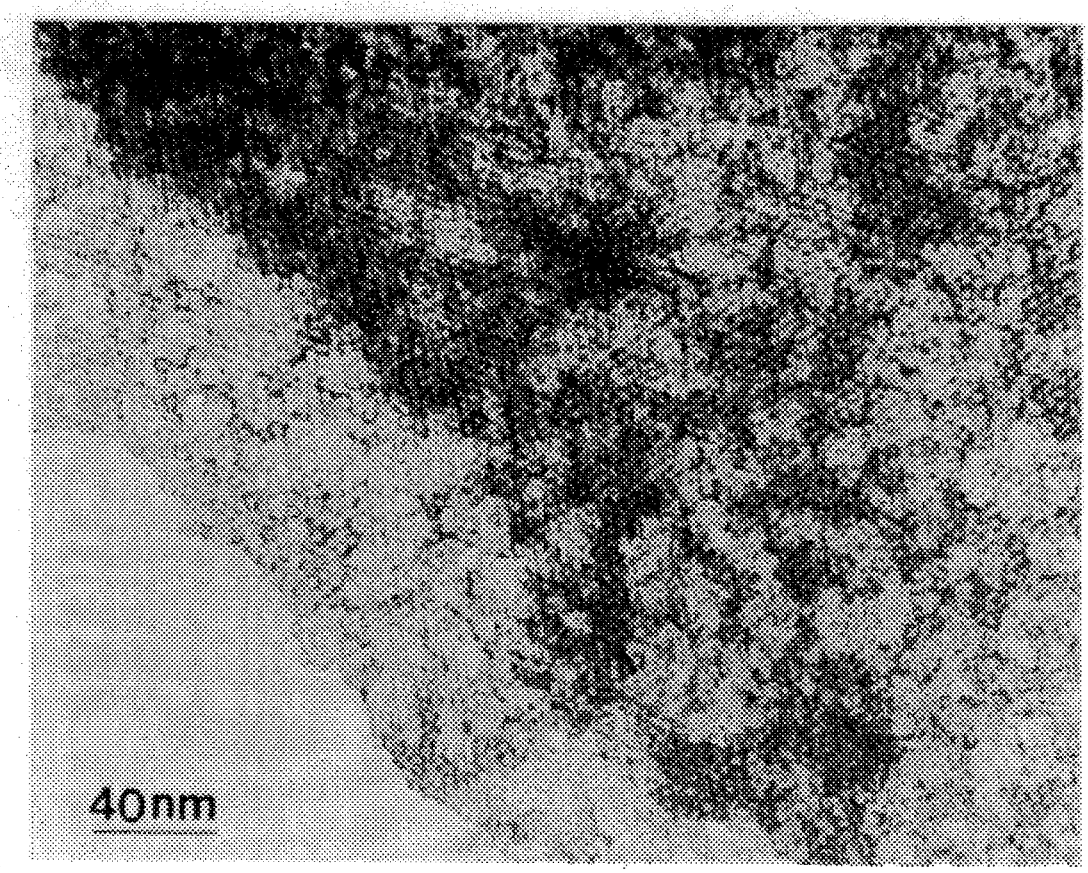
FIG. 4a is a photomicrograph of an aluminosilicate in formamide.

FIG. 4a is a photomicrograph of the resulting aluminosilicate porous ceramic material. The light areas are pores which are seen to be of substantially uniform diameter.

Figure 4B:
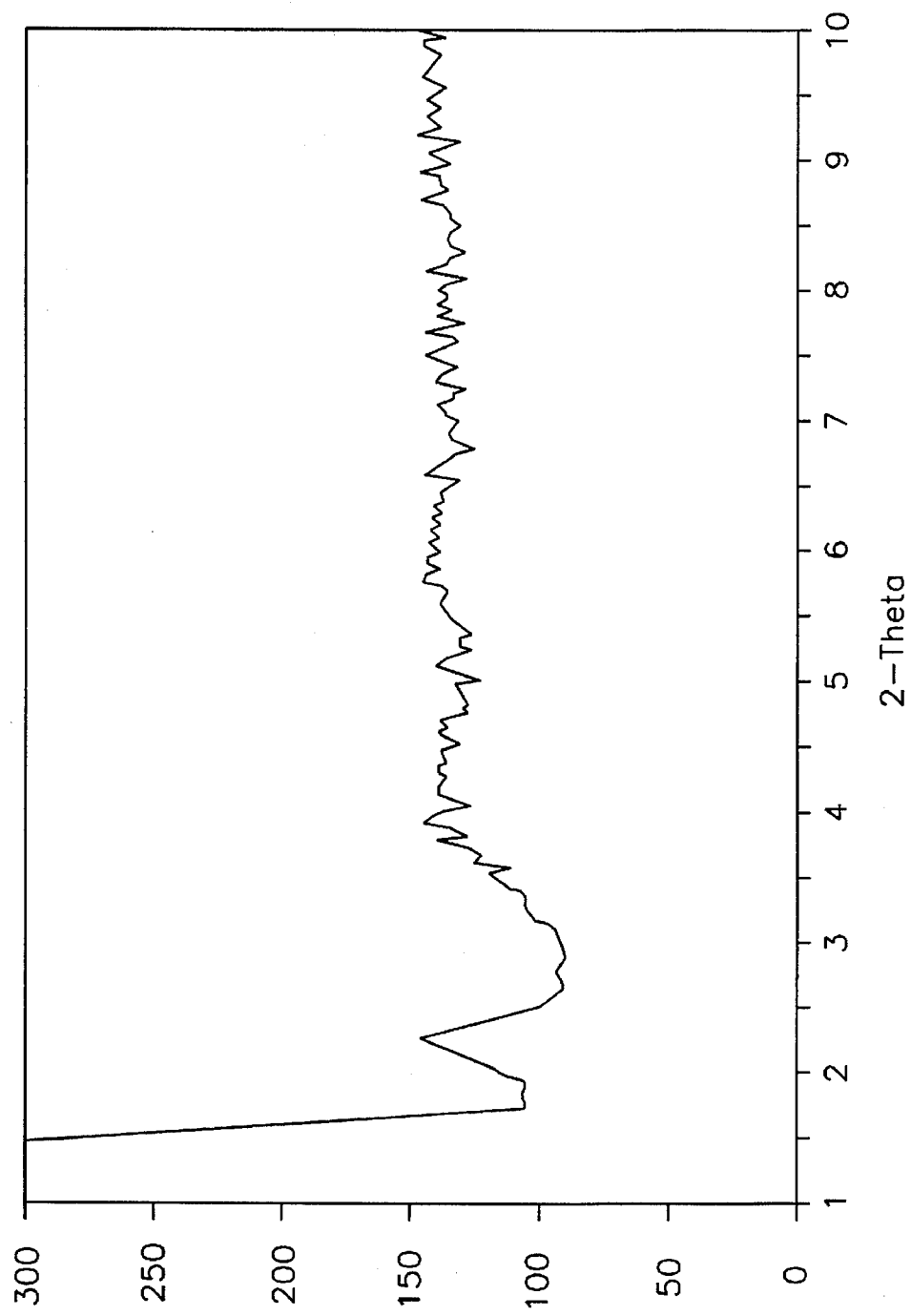
FIG. 4b is an X-ray diffraction pattern of an aluminosilicate material.

FIG. 4b is an XRD pattern of the aluminosilicate in FIG. 4. A peak corresponding to a d-spacing of 38.5 Å indicates the presence of aggregates of surfactant (i.e., micelles) substantially uniform in diameter in the aluminosilicate.

TABLE E4-1

| Mole Ratio | Aluminosilicate, $M_2$ = Al |
|---|---|
| Formamide/CTA+ | 64.0 |
| TMA+/CTA+ | 0.46 |
| $SiO_2$(TMA+)/CTA+ | 0.91 |
| $SiO_2$(TMA+)/$SiO_2$ (HiSil) | 0.44 |
| $M_2$/CTA+ | 0.24 |
| Si/$M_2$ | 12.0 |
| $H_2O$/Formamide | 0.40 |
| $H_2O$/$M_2$ | 105.0 |

EXAMPLE 5

An experiment was conducted to make a silicotitanate porous ceramic material using a non-aqueous solvent. Materials were obtained according to Example 4, with the addition of titanium n-butoxide (BDH Chemicals, Poole, England). Cetyltrimethylammonium chloride (CTAC) was dissolved in formamide, 10 wt % CTAC forming a non-aqueous solution. The non-aqueous solution was contacted with an ion exchange resin, DOWEX-SBR. Effective chloride exchange was about 27 mole %. Reactants of titanium (IV) butoxide (¼ g), and colloidal silica (0.4 g HiSil) were added to the exchanged non-aqueous solution (8.4 g). Tetramethylammonium silicate (1.5 g) was added last and thoroughly mixed into the solution to form a reactive mixture.

Mole ratios of solvents, reactants, surfactants and promoters are given in Table E5-1.

TABLE E5-1

| Mole Ratio | Ti-silicate 1, $M_2$ = Ti |
|---|---|
| Formamide/CTA+ | 64.0 |
| TMA+/CTA+ | 0.47 |
| $SiO_2$(TMA+)/CTA+ | 0.95 |
| $SiO_2$(TMA+)/$SiO_2$ (HiSil) | 0.49 |
| $M_2$/CTA+ | 0.28 |
| Si/$M_2$ | 10.0 |
| $H_2O$/Formamide | 0.42 |
| $H_2O$/$M_2$ | 95.0 |

The reactive mixture was heated to a temperature of 105° C. under autogenous pressure for a total of 65.5 hours. Twenty five minutes after heating began, the reactive mixture was removed from the heating, stirred magnetically for 2 minutes, then replaced into the heating. After the 65.5 hours of heating, the reaction products were quenched in room temperature (25° C.) de-ionized water and recovered by filtration.

Figure 5A:
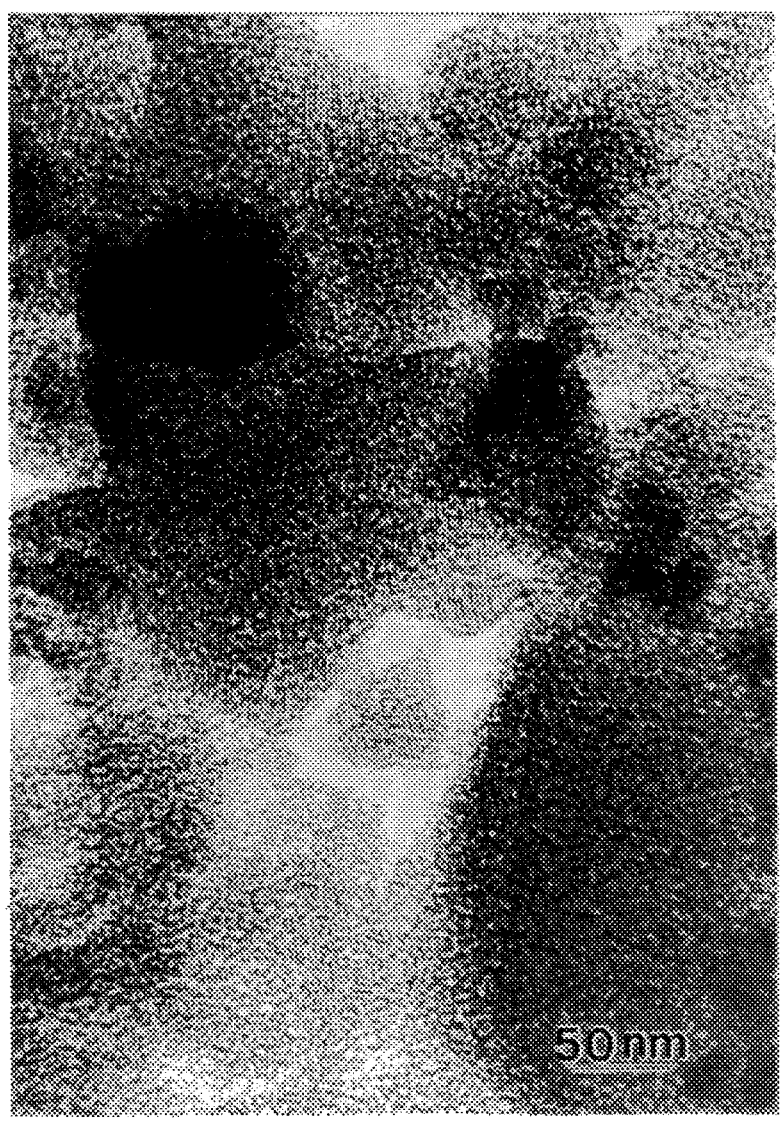
FIG. 5a is a photomicrograph of a silicotitanate porous ceramic material made by a non-aqueous route.

FIG. 5a is a photomicrograph of the silicotitanate porous ceramic material showing a substantially uniform pore size.

Figure 5B:
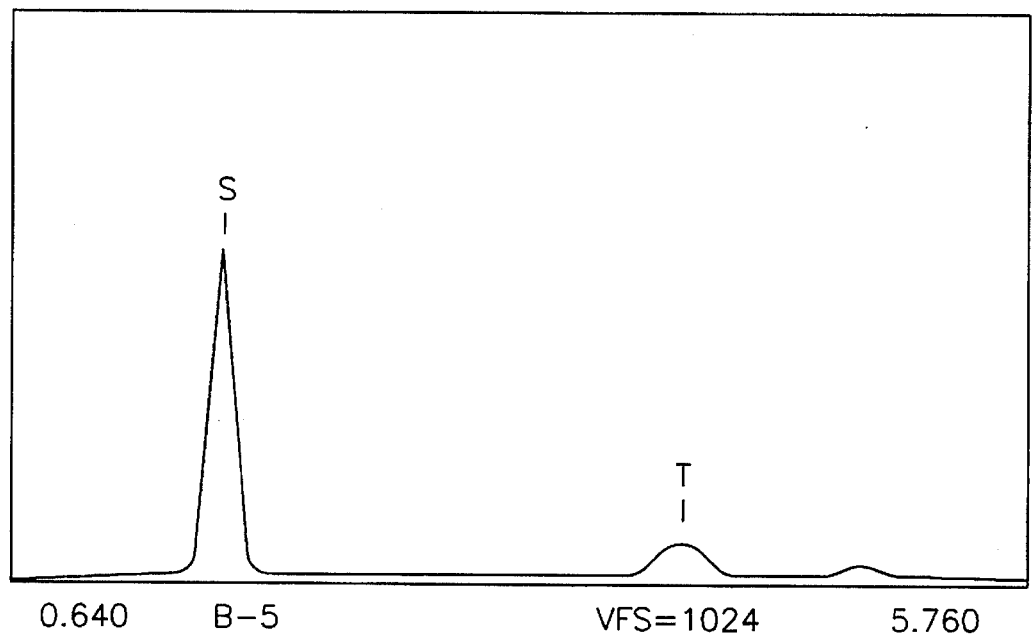
FIG. 5b an analytical trace of an elemental analysis of the silicotitanate material.

FIG. 5b is a composition analysis trace showing the amounts of titanium and silicon in the porous ceramic material. A silicon-to-titanium mole ratio of 1/20 is observed.

Figure 5C:
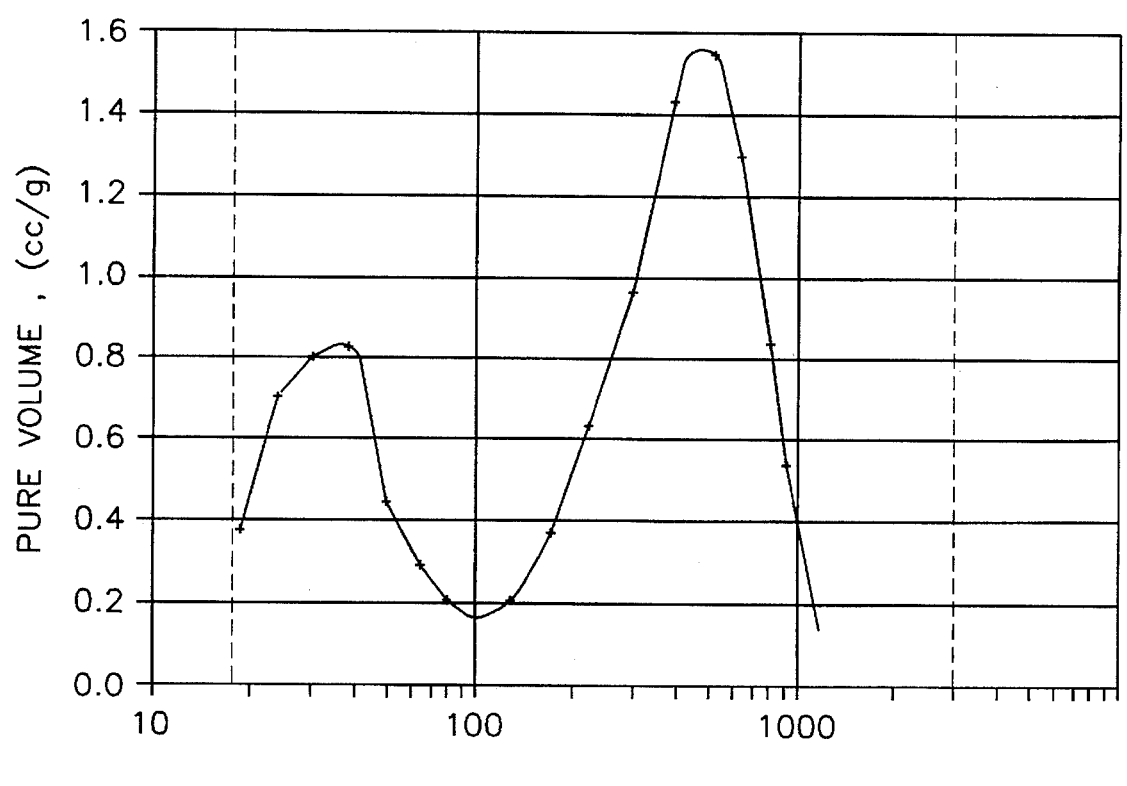
FIG. 5c is a pore size distribution of the silicotitanate material.

FIG. 5c is a substantially uniform pore size distribution of the silicotitanate in FIG. 5a. About 30% of the pore volume is made up of the 40 Å pores. Nitrogen adsorption/desorption measurements also indicate that the BET surface area is 480 $m^2$/g. The significant amount of 40 Å pores combined with the TEM indicate that formamide can be used as the non-aqueous solvent for templating mesoporous ceramic materials from a water-sensitive metal oxide precursor.

EXAMPLE 6

Further experiments were done to increase the amount of titanium in the silicotitanate porous ceramic material. These further experiments were conducted according to Example 5, but with water added in two stages. Table E6-1 shows the relative amounts of compounds used in these experiments.

Reaction mixtures defined in Table E6-1 were prepared from three solutions. Solution 1 was made by adding 1.7 g titanium n-butoxide, followed by 0.12 g colloidal silica, to a 10 wt % CTAC solution in formamide (6.2 g CTAC, 56 g formamide) which had been contacted with DOWEX-1 (effective amount of ch loride exchanged with hydroxide was less than 1 percent). Solution 2 was a 25 wt % water-in-formamide solution. Solution 3 was aqueous tetramethylammonium silicate as described in Example 1. Mixture A was prepared by adding 1.4 g of Solution 3 to 9 g of Solution 1 and mixing for 2 minutes. Mixture B was prepared by adding 0.18 g of Solution 2 to 14 g of Solution 1, mixing the initial mixture for 2 minutes, then adding 2.2 g of Solution 3 and mixing for 2 minutes to complete the reaction mixture. Samples C and D were prepared similarly as Mixture B, except with increased amount of Solution 2 keeping the relative amount of Solution 1 and 3 constant. In Samples A–D, the initial $H_2O$/Ti mole ratio (before addition of aqueous TMA-silicate) was effectively varied from 0 to 11 (Table E6-1). Ti represents the titanium n-butoxide.

TABLE E6-1

| | Mole Ratio | | | |
|---|---|---|---|---|
| Mole Ratio | A | B | C | D |
| Formamide/CTA+ | 64.0 | 64.0 | 64.0 | 64.0 |
| TMA+/CTA+ | 0.41 | 0.43 | 0.42 | 0.42 |
| $SiO_2$(TMA+)/CTA+ | 0.82 | 0.85 | 0.84 | 0.85 |
| $SiO_2$(TMA+)/$SiO_2$ (HiSil) | 9.0 | 9.3 | 9.1 | 9.3 |
| Ti/CTA+ | 0.25 | 0.25 | 0.25 | 0.25 |
| Si/Ti | 3.7 | 3.8 | 3.8 | 3.8 |
| Final $H_2O$/Form | 0.36 | 0.38 | 0.39 | 0.42 |
| Initial $H_2O$/Ti | 0.0 | 2.3 | 4.5 | 11.0 |
| Reaction $H_2O$/Ti | 94.0 | 99.0 | 100.0 | 108.9 |

Figure 6A:
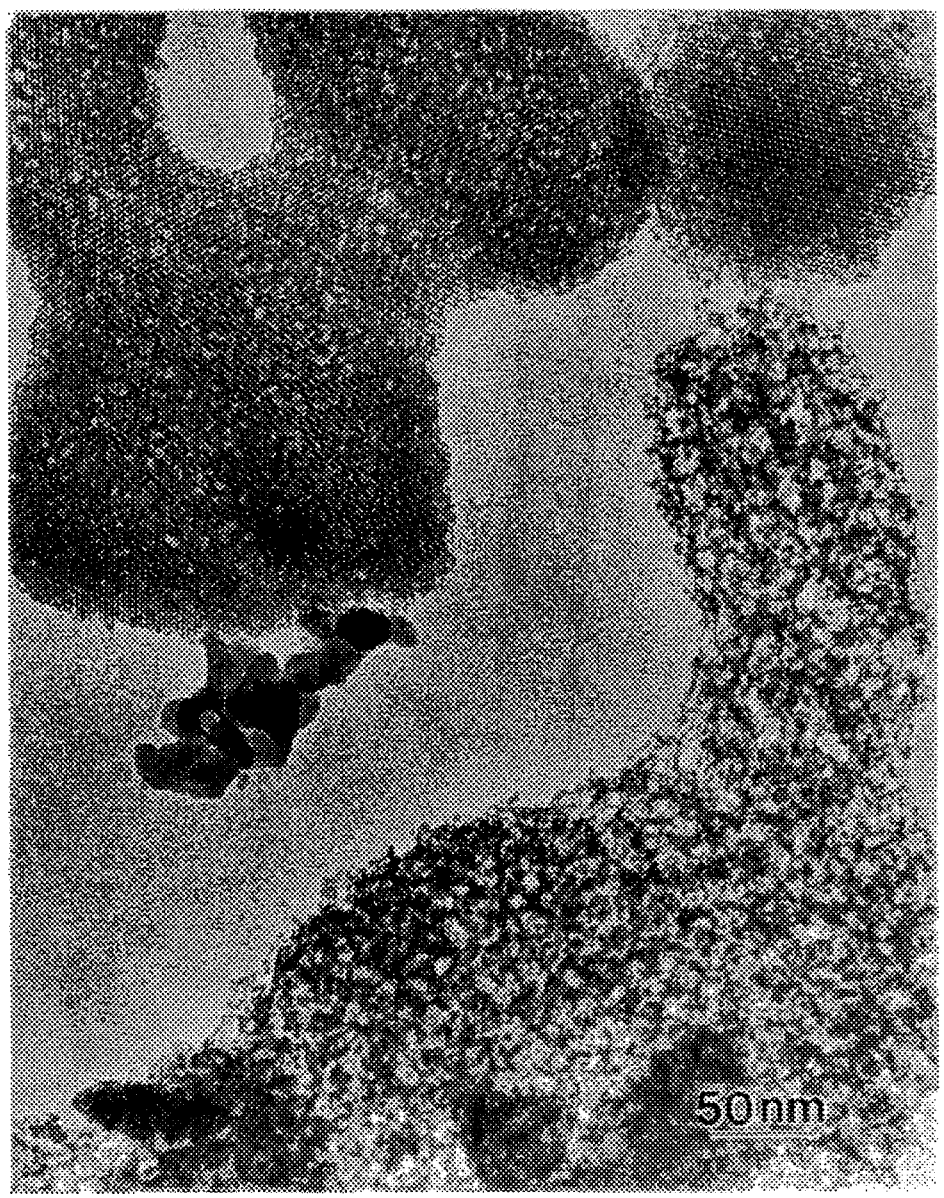
FIG. 6a is a photomicrograph of a silicotitanate porous ceramic material made by a non-aqueous route with reduced amount of silicon.

FIG. 6a is a photomicrograph of the silicotitanate product. The pore size is seen to be substantially uniform and in addition, there are sections of ordered pores.

Figure 6B:

FIG. 6b is a photomicrograph of the silicotitanate product, again showing substantially uniform pore size and sections of ordered pores.

Figure 6C:
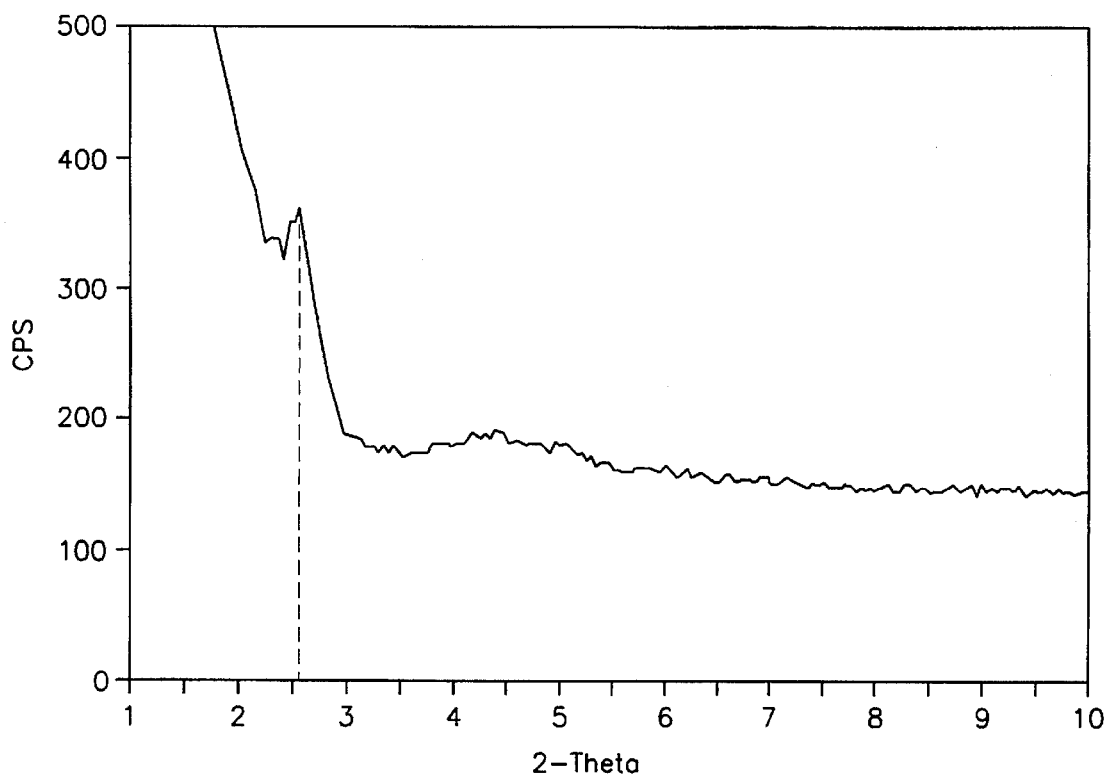

FIG. 6c is a representative X-ray diffraction pattern having a single peak that corresponds to a d-spacing of 34 Å. This indicates the presence of surfactant aggregates (i.e., micelles) substantially unifrom in diameter within the silicotitanate.

FIGS. 6d-a, 6d-b, 6d-c, and 6d-d are compositional analyses corresponding to Table E6-1 samples a–d respectively. The compositional analyses show an increasing concentration of titanium in the uniform pore size as a result of increasing the initial water-to-titanium n-butoxide mole ratio. In FIG. 6d-a, the ratio $TiO_2/SiO_2$ is 0.09. In FIG. 6d-b, the ratio $TiO_2/SiO_2$ is 0.22. In FIG. 6d-c, the ratio $TiO_2/SiO_2$ is 0.23. In FIG. 6d-d, the ratio $TiO_2/SiO_2$ is 0.25.

Figure 6E:
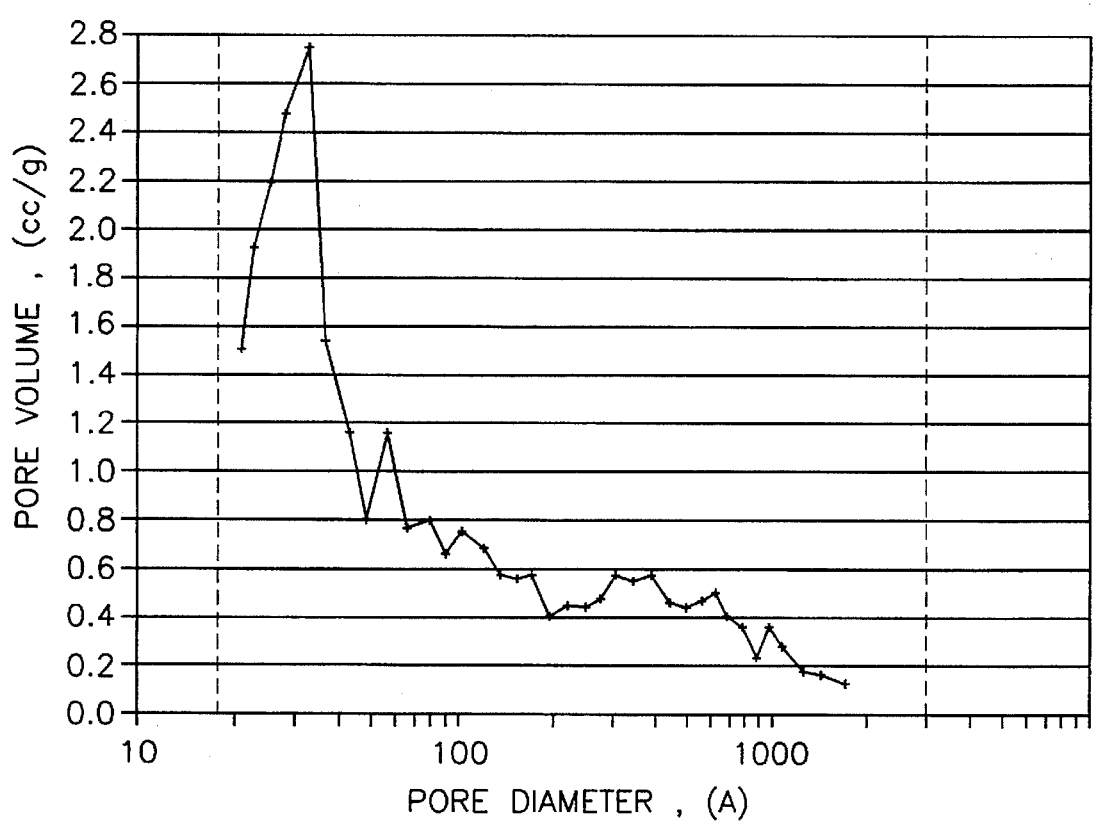
FIG. 6e is an X-ray diffraction pattern of the silicotitanate material of sample c, FIG. 6d-4 c.

FIG. 6e shows the substantially uniform pore size distribution of product of Sample C (Table E6-1) (calcined as in Example 1) resulting from a nitrogen desorption analysis. Most pores are between about 20 Å and 50 Å, and some pores are above 50 Å. Surface area from BET analysis is greater than 1100 $m^2/g$.

EXAMPLE 7

An experiment was done to make silicotitanate ceramic porous material with an aqueous route. The procedure was according to Example 1 except that a titanium precursor, titanium (IV) butoxide was used. Table E7-1 shows the relative amounts of compounds used in this experiment.

Figure 7A:
FIG. 7a is a photomicrograph of a silicotitanate material made with an aqueous route.
Figure 7B:
FIG. 7b is a photomicrograph of a silicotitanate material made with an aqueous route.

FIGS. 7a and 7b are photomicrographs of the product material from this experiment. The fine detail is lacking in these photomicrographs thereby showing that a mesoporous ceramic material was not obtained.

TABLE E7-1

| | Mole Ratio | |
|---|---|---|
| Mole Ratio | HiSil added 1st 55715-51 | Titanium (IV) butoxide added 1st 55715-53A |
| $H_2O/CTA+$ | 78.0 | 78.0 |
| TMA+/CTA+ | 0.60 | 0.45 |
| $SiO_2(TMA+)/CTA+$ | 1.2 | 0.90 |
| $SiO_2(TMA+)/SiO_2$ (HiSil) | 2.1 | 8.6 |
| Ti/CTA+ | 0.27 | 0.25 |
| Si/Ti | 6.6 | 4.0 |
| $H_2O/Ti$ | 292.0 | 315.0 |

EXAMPLE 8

An experiment was conducted to make an aluminosilicate porous ceramic material using a non-aqueous solvent. Materials were obtained as in Example 1, with the addition of glycerol, obtained from J. T. Baker, Phillipsburg, N.J. Cetyltrimethylammonium chloride (CTAC) was dissolved in glycerol, 29 wt % CTAC. The 29 wt % CTAC in glycerol (5.683 g) was diluted with methanol (2.261 g) in order to produce a low-viscosity non-aqueous solution, and the resulting 20.75 wt % non-aqueous CTAC solution was contacted with an ion exchange resin, DOWEX-SBR, forming the non-aqueous preparation. The amount of chloride exchanged with hydroxide was between about 11 and 15 mole percent. Sodium aluminate (0.088 g), was mixed into the non-aqueous preparation (5.859 g), then colloidal silica (0.523 g HiSil) was added to the non-aqueous mixture. Tetramethylammonium silicate (2.078 g) was added last and thoroughly mixed into the solution for two minutes to form a reactive mixture.

The reactive mixture was sealed in a fluorocarbon-lined steel reactor and reacted at 105° C. under autogenous pressure and static conditions (no stirring) for a total of 61 hours. After the 61 hours of heating, the reaction products were quenched in room temperature (25° C.) de-ionized water and recovered by filtration.

Figure 8A:
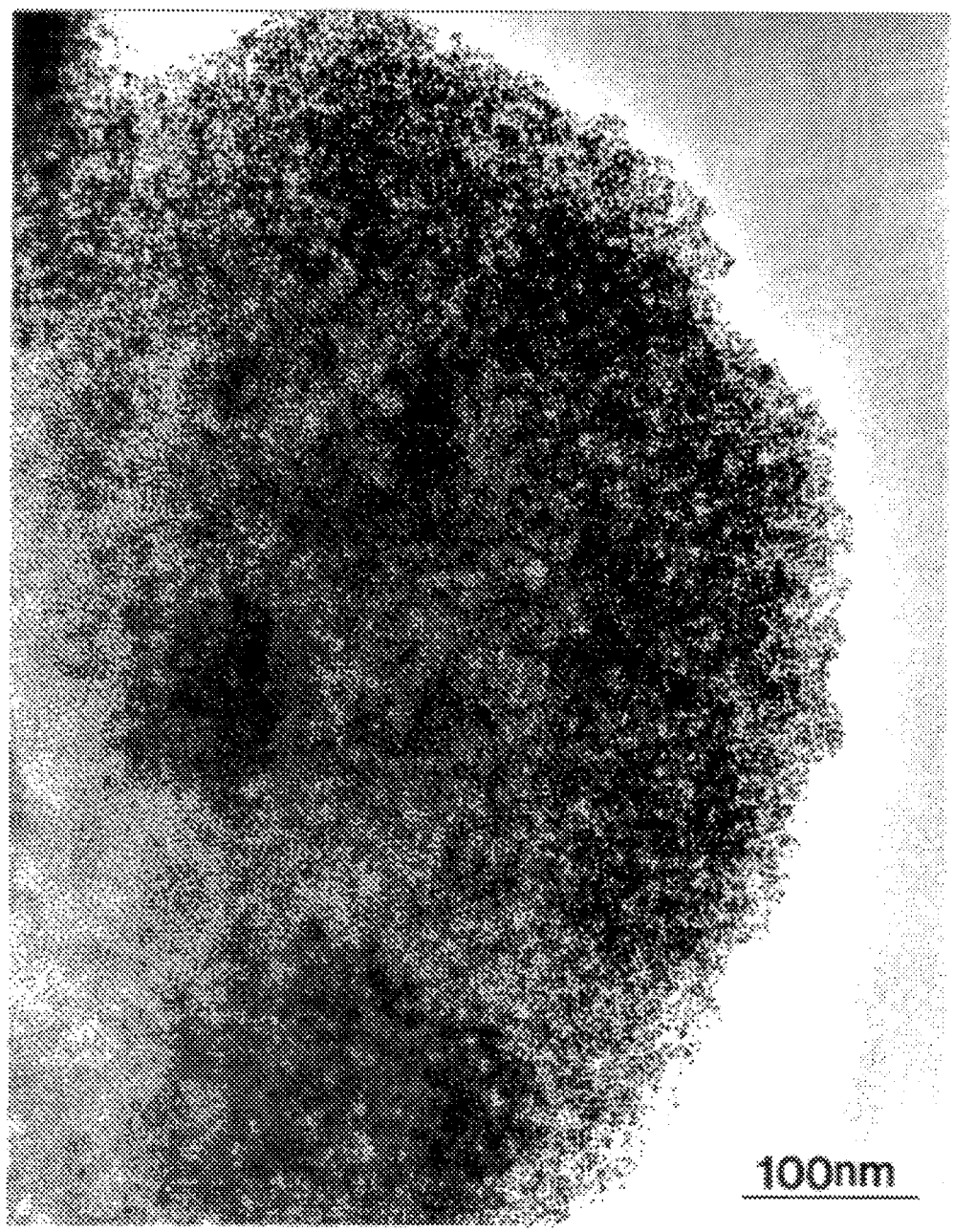
FIG. 8a is a micrograph of aluminosilicate made in glycerol.

FIG. 8a is a photomicrograph of the resulting aluminosilicate porous ceramic material. The light areas are pores which are seen to be of substantially uniform diameter.

Figure 8B:
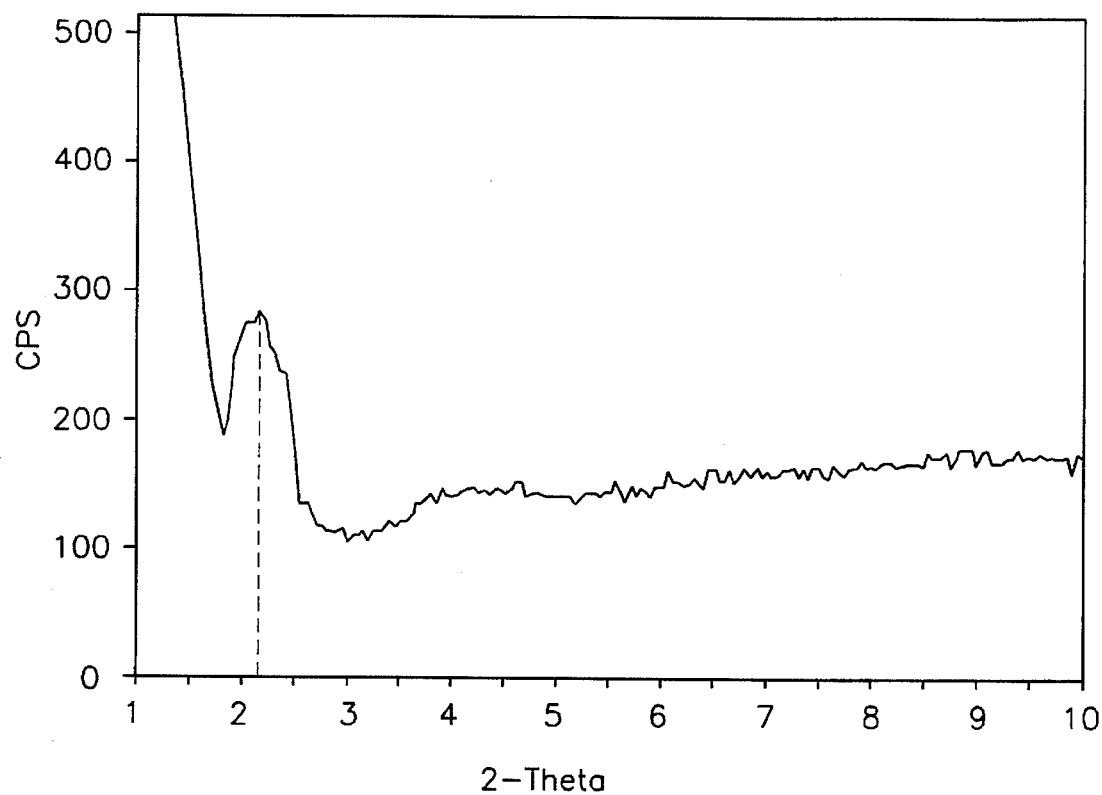
FIG. 8b is an X-ray diffraction pattern of the aluminosilicate made in glycerol.

FIG. 8b is an XRD pattern of the aluminosilicate in FIG. 8a. A peak corresponding to a d-spacing of 41 Å indicates the presence of aggregates of surfactant (i.e., micelles) substantially uniform in diameter in the aluminosilicate.

CLOSURE

A mesoporous ceramic material having substantially uniform pore size distribution may be further treated to place additional material within the pores. Organic material, including surfactant, may be placed in the pores. Alternatively, surfactant may be removed or replaced permitting introduction of functional end groups, such as $-COOH$, $-SO_3H$, $-PO_4H_2$, $-NH_2$, $-CH_3$. Bunker et al. Ceramic thin film formation on functionalized interfaces through biomimetic processing Science 264, 48–55 (1994)]. These functional end-groups can be used to catalyze chemical reactions, achieve a chemical separation, or can induce nucleation and growth of crystal phases which may then function as a catalyst. For example, sulfonate ($SO_3H$) can promote growth of iron hydroxide crystals which catalyze coal liquefaction. For example, sulfonated mesoporous zirconia can be used as a solid superacid catalyst for alkylation of hydrocarbons, paraffin cracking and isomerization, and olefin polymerization.

While a preferred embodiment of the present invention has been shown and described, it will be apparent to those skilled in the art that many changes and modifications may be made without departing from the invention in its broader aspects. The appended claims are therefore intended to cover all such changes and modifications as fall within the true spirit and scope of the invention.

We claim:

1. A method for making a mesoporous ceramic material, comprising the steps of:
    (a) placing a reactive mixture of at least one ceramic precursor with at least one surfactant into a reactive vessel;
    (b) providing a substrate and placing said substrate in contact with said reactive mixture; and
    (c) forming micellar aggregates in said reactive mixture and then forming the mesoporous ceramic material on the substrate.

2. The method as recited in claim 1, wherein the formed mesoporous ceramic material is a membrane.

3. The method as recited in claim 1, wherein the substrate is silicon.

4. The method as recited in claim 1, further comprising the step of:
    adding a promoter to the reactive mixture.

5. The method as recited in claim 1, wherein the reactive mixture and the substrate are heated in the reaction vessel for a period of time and said heating forms the mesoporous ceramic material on the substrate.

6. The method as recited in claim 5, wherein the formed mesoporous ceramic material is an oxide.

7. The method as recited in claim 1, wherein the substrate is selected from the group consisting of silicon, silica, zirconia, titania, and borosilicate glass.

8. The method as recited in claim 1, wherein the substrate is dense.

9. The method as recited in claim 1, wherein the substrate is porous.

10. The method material, as recited in claim 1, wherein said reactive mixture is prepared according to the steps of:

(a) preparing a non-aqueous solution of a non-aqueous solvent and a surfactant;

(b) adding said at least one ceramic precursor into the non-aqueous solution forming an intermediate solution; and (c) gradually adding a controlled amount of water to the intermediate solution to form said reactive mixture.

11. The method as recited in claim 10, wherein the ceramic precursor is at least one compound selected from the group consisting of metal alkoxide, metal halide, and metal oxychloride.

12. The method as recited in claim 11, wherein the metal alkoxide is at least one compound selected from the group consisting of titanium ethoxide, titanium iso-propoxide, titanium n-butoxide, zirconium iso-propoxide, zirconium n-propoxide, zirconium (IV) butoxide, niobium (V) ethoxide, and yttrium oxide isopropoxide.

13. The method as recited in claim 11, wherein the metal halide is a metal chloride.

14. The method as recited in claim 13, wherein the metal chloride is at least one compound selected from the group consisting of titanium (III) chloride, titanium (IV) chloride, tantalum (IV) chloride, zirconyl chloride, niobium (V) chloride, and yttrium (III) chloride.

15. The method as recited in claim 11, wherein the metal oxychloride is at least one compound selected from the group consisting of zirconyl oxychloride, and hafnium chloride.

16. The method as recited in claim 10, further comprising the step of:

adding a promoter to the reactive mixture.

17. The method as recited in claim 16, wherein the promoter is a metal oxide anion stabilized with a quaternary ammonium cation.

18. The method as recited in claim 17, wherein the quaternary ammonium cation is at least one compound selected from the group consisting of tetramethylammonium, tetraethylammonium, and tetrabutylammonium cation.

19. The method as recited in claim 17, wherein the metal oxide anion is at least one compound selected from the group consisting of silicate, aluminate, and titanate.

20. The method as recited in claim 10, further comprising the step of:

adding at least one additional ceramic precursor after at least step (c).

21. The method as recited in claim 10, wherein the non-aqueous solvent is at least one compound selected from the group of formamide, formic acid, dimethylsulfoxide, dimethylformamide, glycerol, ethanol, and methanol.

22. A method for making a mesoporous ceramic material, comprising the steps of:

(a) providing a reaction vessel and a substrate positioned inside said reaction vessel; and (b) placing a reactive mixture of at least one ceramic precursor with at least one surfactant into the reaction vessel and in contact with said substrate; and (c) forming micellar aggregates in said reactive mixture and then forming the mesoporous ceramic material on the substrate.

23. The method as recited in claim 22, wherein the formed mesoporous ceramic material is a membrane.

24. The method as recited in claim 22, wherein the substrate is silicon.

25. The method as recited in claim 22, further comprising the step of:

adding a promoter to the reactive mixture.

26. The method as recited in claim 22, wherein the reactive mixture and the substrate are heated in the reaction vessel for a period of time and said heating forms the mesoporous ceramic material on the substrate.

27. The method as recited in claim 26, wherein the formed mesoporous ceramic material is an oxide.

28. The method as recited in claim 22, wherein the substrate is selected from the group consisting of silicon, silica, zirconia, titania, and borosilicate glass.

29. The method as recited in claim 22, wherein the substrate is dense.

30. The method as recited in claim 22, wherein the substrate is porous.

* * * * *

UNITED STATES PATENT AND TRADEMARK OFFICE
CERTIFICATE OF CORRECTION

PATENT NO. : 5,645,891
DATED : 07/08/97
INVENTOR(S) : Liu et al.

It is certified that error appears in the above-indentified patent and that said Letters Patent is hereby corrected as shown below:

In column 4, line 13, please replace "6*d-4c*." with --6*d-c.*--.

Signed and Sealed this

Twenty-eighth Day of October, 1997

Attest:

BRUCE LEHMAN

Attesting Officer

Commissioner of Patents and Trademarks